US012666365B2

(12) United States Patent (10) Patent No.: US 12,666,365 B2
Umeda et al. (45) **Date of Patent: *Jun. 23, 2026**

(54) EXPLOITATION OF TRANSMITTER (TX) POWER FOR EACH BAND DUAL UP-LINK (UL) CARRIER AGGREGATION (CA)

(71) Applicant: NOKIA TECHNOLOGIES OY, Espoo (FI)

(72) Inventors: Hiromasa Umeda, Kawasaki (JP); Petri Juhani Vasenkari, Turku (FI); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/285,140

(22) PCT Filed: Mar. 29, 2022

(86) PCT No.: PCT/US2022/071423

§ 371 (c)(1),
(2) Date: Sep. 29, 2023

(87) PCT Pub. No.: WO2022/213075

PCT Pub. Date: Oct. 6, 2022

(65) Prior Publication Data

US 2024/0179634 A1 May 30, 2024

Related U.S. Application Data

(63) Continuation of application No. 17/301,370, filed on Mar. 31, 2021, now Pat. No. 11,924,769.

(51) Int. Cl.
*H04W 52/14* (2009.01)
*H04W 8/24* (2009.01)
*H04W 52/36* (2009.01)

(52) U.S. Cl.
CPC ........... *H04W 52/146* (2013.01); *H04W 8/24* (2013.01); *H04W 52/367* (2013.01)

(58) Field of Classification Search
CPC ... H04W 52/146; H04W 52/367; H04W 8/24; H04W 52/346; H04L 5/001
See application file for complete search history.

(56) References Cited

U.S. PATENT DOCUMENTS

| | | | |
|---|---|---|---|
| 11,096,100 B1 | 8/2021 | Saha et al. | |
| 2017/0230843 A1 | 8/2017 | Ouchi et al. | |

(Continued)

FOREIGN PATENT DOCUMENTS

| | | |
|---|---|---|
| CN | 102740441 A | 10/2012 |
| CN | 111406428 A | 7/2020 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.4.0, (Mar. 2021), 1087 pages.

(Continued)

*Primary Examiner* — Zhensheng Zhang
(74) *Attorney, Agent, or Firm* — ALSTON & BIRD LLP

(57) ABSTRACT

Various techniques are provided for a method including receiving, at a network device from a user equipment (UE), an indication of a UE capability to support a per-band maximum power for a radio band combination (BC) used by the UE, determining whether the UE supports per-band maximum power for the radio BC based on the indication of the UE capability, and in response to determining the UE supports per-band maximum power for the radio BC, determining a total UE transmission power based on a sum of a maximum power of each band in the radio BC.

22 Claims, 7 Drawing Sheets

(56) References Cited

U.S. PATENT DOCUMENTS

| | | | | | |
|---|---|---|---|---|---|
| 2018/0206113 | A1* | 7/2018 | He | | H04W 8/24 |
| 2019/0104476 | A1 | 4/2019 | Lim et al. | | |
| 2019/0166565 | A1 | 5/2019 | Gaal et al. | | |
| 2019/0261286 | A1 | 8/2019 | Suzuki et al. | | |
| 2019/0268127 | A1 | 8/2019 | Hosseini et al. | | |
| 2021/0022083 | A1 | 1/2021 | Takahashi et al. | | |
| 2021/0153143 | A1 | 5/2021 | Sridharan et al. | | |
| 2023/0354216 | A1 | 11/2023 | Xing | | |

FOREIGN PATENT DOCUMENTS

| | | | | | |
|---|---|---|---|---|---|
| CN | 111758235 | A | 10/2020 | | |
| EP | 3335450 | A1 | 6/2018 | | |
| EP | 3413639 | A1 | 12/2018 | | |
| EP | 3780776 | A1 * | 2/2021 | | H04W 52/146 |
| EP | 3793273 | A1 | 3/2021 | | |
| EP | 4266768 | A1 | 10/2023 | | |
| JP | 2020-048002 | A | 3/2020 | | |
| WO | WO 2015/116866 | A1 | 8/2015 | | |
| WO | 2017/027057 | A1 | 2/2017 | | |
| WO | 2022/147731 | A1 | 7/2022 | | |

OTHER PUBLICATIONS

"3rd Generation Partnership Project; Technical Specification Group Radio Access Network; Evolved Universal Terrestrial Radio Access (E-UTRA); User Equipment (UE) radio access capabilities (Release 16)", 3GPP TS 36.306 V16.4.0, (Mar. 2021), 146 pages.

"3rd Generation Partnership Project; Technical Specification Group Radio Access Network; NR; Radio Resource Control (RRC) protocol specification (Release 16)", 3GPP TS 38.331-1 V16.4.1, (Mar. 2021), 949 pages.

"3rd Generation Partnership Project; Technical Specification Group Radio Access Network; NR; User Equipment (UE) radio access capabilities (Release 16)", 3GPP TS 38.306 V16.4.0, (Mar. 2021), 151 pages.

"3rd Generation Partnership Project; Technical Specification Group Radio Access Network; NR; User Equipment (UE) radio transmission and reception; Part 1: Range 1 Standalone (Release 15)", 3GPP TS 38.101-1 V15.11.0, (Sep. 2020), 239 pages.

"3rd Generation Partnership Project; Technical Specification Group Radio Access Network; NR; User Equipment (UE) radio transmission and reception; Part 1: Range 1 Standalone (Release 16)", 3GPP TS 38.101-1 v16.6.0, (Dec. 2020), 442 pages.

"3rd Generation Partnership Project; Technical Specification Group Radio Access Network; NR; User Equipment (UE) radio transmission and reception; Part 1: Range 1 Standalone (Release 17)", 3GPP TS 38.101-1 V17.0.0, (Dec. 2020), 488 pages.

"3rd Generation Partnership Project; Technical Specification Group Radio Access Network; NR; User Equipment (UE) radio transmission and reception; Part 3: Range 1 and Range 2 Interworking operation with other radios (Release 17)", 3GPP TS 38.101-3 V17.0.0, (Dec. 2020), 667 pages.

Apple Inc., "Discussion on UE capability for power class for NR band in MR-DC combination", 3GPP TSG-RAN WG2 Meeting #111e, R2-2007112, (Aug. 17-28, 2020), 5 pages.

China Telecom, "Discussion on SAR schemes for UE power class 2 NR inter-band CA with 2UL", 3GPP TSG-RAN WG4 Meeting #96-e, R4-2010270, (Aug. 17-28, 2020), 7 pages.

China Telecom, "Revised WID: SAR schemes for UE power class 2 (PC2) for NR inter-band Carrier Aggregation and supplemental uplink (SUL) configurations with 2 bands UL", 3GPP TSG-RAN Meeting #89e, RP-201584, (Sep. 14-18, 2020), 5 pages.

Ericsson, "Correction to the lower limit of Pumax", 3GPP TSG-RAN WG4 Meeting #98-e, Change Request CR 0645, R4-2101715, (Jan. 25-Feb. 5, 2021), 6 pages.

Ericsson, "E234/E235 [AH1807#13][NR] Email Report on Power Class and P-max", 3GPP TSG-RAN WG2 #103, R2-1812240, (Aug. 20-24, 2018), 8 pages.

Examination Report for Australian Application No. 2022246953 dated Jul. 23, 2024, 4 pages.

Huawei et al., "On the capability of EN-DC power class", 3GPP TSG-RAN2 Meeting #108, R2-1915899, (Nov. 18-22, 2019), 3 pages.

Huawei, "Network slice selection", RAN WG3 Meeting #92, R3-161134, (May 23-27, 2016), 4 pages.

International Search Report and Written Opinion for Patent Cooperation Treaty Application No. PCT/US2022/071423 dated Jul. 7, 2022, 16 pages.

Office Action for Chinese Application No. 202280021236.6 dated May 10, 2024, 16 pages.

Office Action for European Application No. 22718035.3 dated Oct. 15, 2024, 6 pages.

Office Action for Japanese Application No. 2023-558198 dated Jul. 29, 2024, 8 pages.

Office Action for Saudi Arabian Application No. 523450767 dated Jully 5, 2024, 14 pages.

Office Action for Vietnamese Application No. 1-2023-06131 dated Mar. 28, 2024, 3 pages.

OPPO, "Discussion on UE power class high limit", 3GPP TSG-RAN WG4 Meeting #98e, R4-2101749, (Jan. 25-Feb. 5, 2021), 4 pages.

Qualcomm Incorporated, "Increasing UE maximum output power", 3GPP TSG-RAN WG4 #98-e, R4-2102414, (Jan. 25-Feb. 5, 2021), 3 pages.

Qualcomm Incorporated, "Upper limits on output power for dual Pa", 3GPP TSG-RAN WG4 #97-e, R4-2016439, (Nov. 2-13, 2020), 4 pages.

Samsung, "Introducing support for NR, changes only relevant for SA", 3GPP TSG-RAN WG2 NR AH 1807, Change Request CR 3186, R2-1810368, (Jul. 2-6, 2018), 118 pages.

Notice of Allowance for ARIPO Application No. AP/P/2023/015035 dated Sep. 2, 2025, 5 pages.

Office Action for Korean Application No. 10-2023-7030146 dated Sep. 2, 2025, 16 pages.

Decision of Refusal for Japanese Application No. 2023-558198 dated Jan. 21, 2025, 5 pages.

Decision to Grant for Chinese Application No. 202280021236.6 dated Jan. 15, 2025, 4 pages.

Examination Report for Australian Application No. 2022246953 dated Nov. 1, 2024, 2 pages.

Notice for Eligibility of Grant for Singapore Application No. 11202306238V dated Apr. 16, 2025, 4 pages.

Notice of Acceptance for Australian Application No. 2022246953 dated Jan. 20, 2025, 3 pages.

Notice of Issuance for Mexican Application No. MX/a/2023/011381 dated Oct. 10, 2024, 6 pages.

Office Action for Algerian Application No. DZ/P/2023/1653 dated Jan. 23, 2024, 2 pages.

Office Action for Canadian Application No. 3,213,781 dated Dec. 5, 2024, 4 pages.

Office Action for Chilean Application No. 202302689 dated Mar. 24, 2025, 35 pages.

Office Action for Chilean Application No. 202302689 dated Sep. 24, 2024, 30 pages.

Office Action for Chinese Application No. 202280021236.6 dated Sep. 25, 2024, 7 pages.

Notice of Issuance for Chilean Application No. 2023-02689 dated Jul. 15, 2025, 2 pages.

Office Action for ARIPO Application No. AP/P/2023/015035 dated Jun. 5, 2025, 5 pages.

Office Action for Japanese Application No. 2023-558198 dated Aug. 12, 2025, 5 pages.

Examination Report for Australian Application No. 2025202464 dated Mar. 5, 2026, 4 pages.

Notice of Allowance for Vietnamese Application No. 1-2023-06131 dated Feb. 27, 2026, 2 pages.

Office Action for Chilean Application No. 202402540 dated Feb. 16, 2026, 36 pages.

Office Action for Malaysian Application No. PI2023005844 dated Feb. 16, 2026, 4 pages.

(56)　　　　References Cited

OTHER PUBLICATIONS

Decision to Grant for Japanese Application No. 2023-558198 dated Oct. 30, 2025, 4 pages.
Notice of Allowance for Philippine Application No. 1/2023/551985 dated Jan. 7, 2026, 3 pages.
Office Action for Canadian Application No. 3,213,781 dated Dec. 16, 2025, 8 pages.
Substantive Examination Report for Philippine Application No. 1/2023/551985 dated Oct. 17, 2025, 5 pages.

* cited by examiner

Example Wireless Network 130

Cell
136

User Device
(UE) 131

User Device
(UE) 132

User Device
(UE) 133

User Device
(UE) 135

Base Station
(BS)
134

151

Core
Network
150

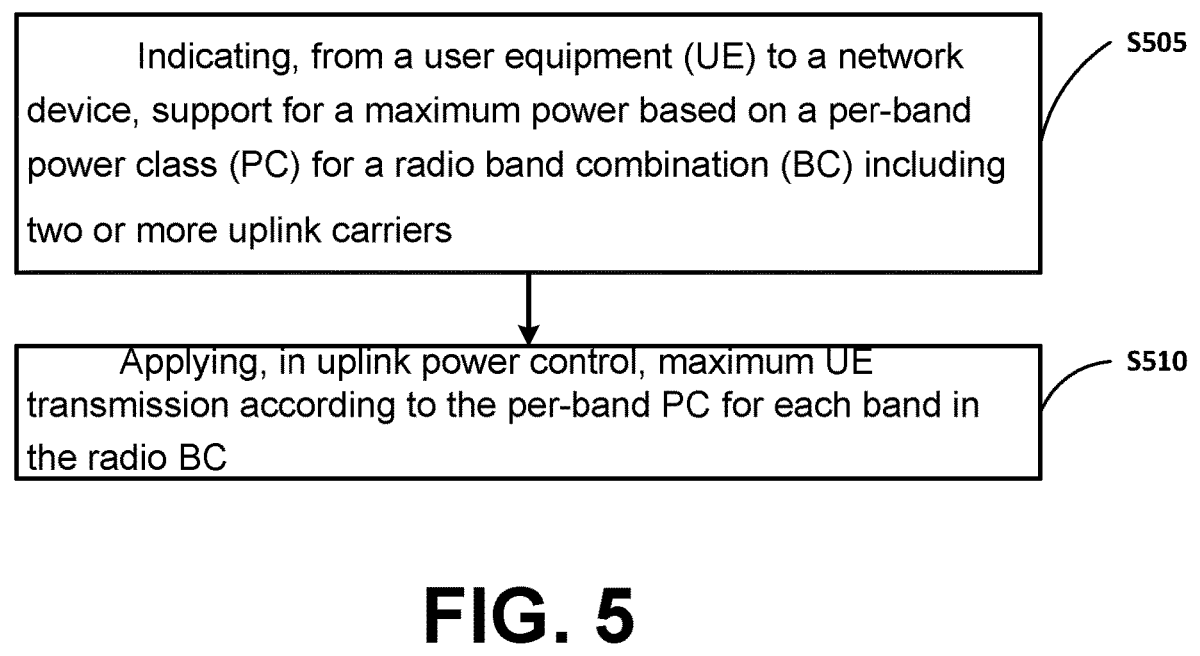

Indicating, from a user equipment (UE) to a network device, support for a maximum power based on a per-band power class (PC) for a radio band combination (BC) including two or more uplink carriers — S505

Applying, in uplink power control, maximum UE transmission according to the per-band PC for each band in the radio BC — S510

FIG. 5

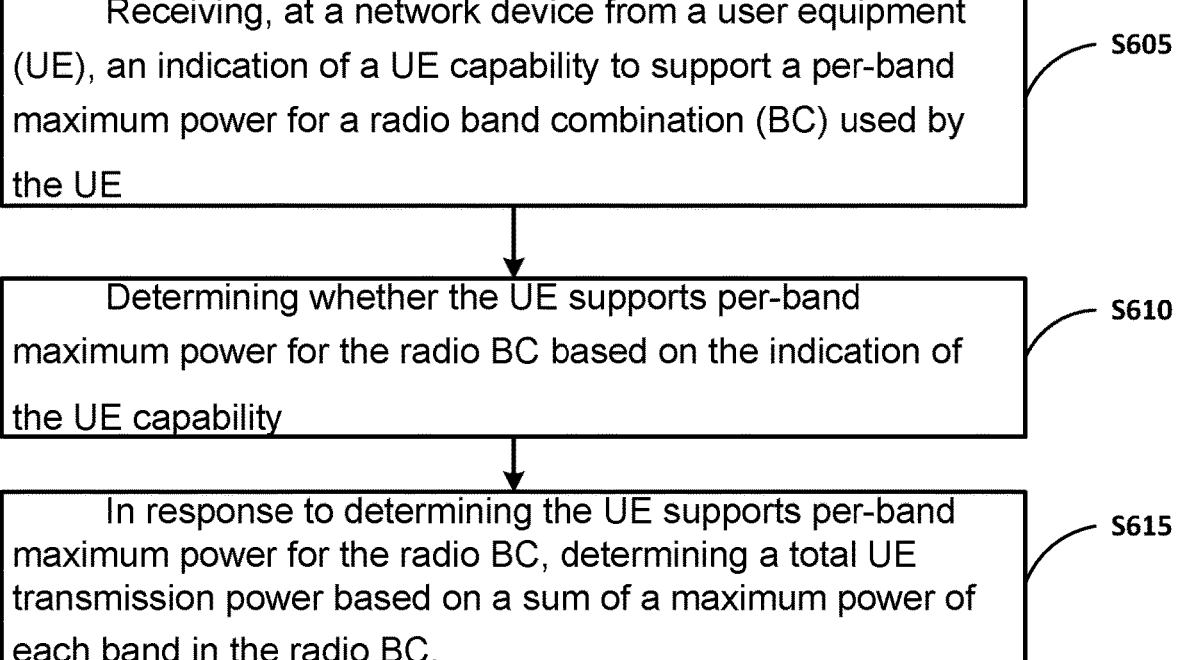

Receiving, at a network device from a user equipment (UE), an indication of a UE capability to support a per-band maximum power for a radio band combination (BC) used by the UE    S605

Determining whether the UE supports per-band maximum power for the radio BC based on the indication of the UE capability    S610

In response to determining the UE supports per-band maximum power for the radio BC, determining a total UE transmission power based on a sum of a maximum power of each band in the radio BC.    S615

FIG. 6

EXPLOITATION OF TRANSMITTER (TX) POWER FOR EACH BAND DUAL UP-LINK (UL) CARRIER AGGREGATION (CA)

RELATED APPLICATION

The present application is a National Stage Entry of International Patent Application No. PCT/US2022/071423, filed Mar. 29, 2022, entitled "EXPLOITATION OF TRANS-MITTER (TX) POWER FOR EACH BAND DUEL UP-LINK (UL) CARRIER AGGREGATION (CA)," which claims priority to, and is a continuation of, U.S. application Ser. No. 17/301,370, filed Mar. 31, 2021, entitled "EXPLOI-TATION OF TRANSMITTER (TX) POWER FOR EACH BAND DUAL UP-LINK (UL) CARRIER AGGREGA-TION (CA)," the entire disclosures of each of which are hereby incorporated herein by reference in their entireties for all purposes.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terres-trial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the require-ments of 5G, similar to earlier evolution of 3G and 4G wireless networks. 5G is also targeted at the new emerging use cases in addition to mobile broadband. A goal of 5G is to provide significant improvement in wireless performance, which may include new levels of data rate, latency, reliabil-ity, and security. 5G NR may also scale to efficiently connect the massive Internet of Things (IoT) and may offer new types of mission-critical services. For example, ultra-reli-able and low-latency communications (URLLC) devices may require high reliability and very low latency.

SUMMARY

In a general aspect, a device, a system, a non-transitory computer-readable medium (having stored thereon com-puter executable program code which can be executed on a computer system), and/or a method can perform a process with a method including indicating, from a user equipment (UE) to a network device, support for a maximum power based on a per-band power class (PC) for a radio band combination (BC) including two or more uplink carriers and applying, in uplink power control, maximum UE transmis-sion according to the per-band PC for each band in the radio BC.

Implementations can include one or more of the following features. For example, uplink carrier aggregation (CA) can be supported by the UE. The radio BC can support two or more uplink CA. The method can further include indicating, from the UE to the network device, the per-band PC for each band in the radio BC. The indicating of the support for the maximum power based on a per-band indicates that the UE can be capable of operating at full power in each uplink band. If a radio band includes two or more uplink carriers, the combined power can be limited to the PC for the associated radio band.

In a general aspect, a device, a system, a non-transitory computer-readable medium (having stored thereon com-puter executable program code which can be executed on a computer system), and/or a method can perform a process with a method including receiving, at a network device from a user equipment (UE), an indication of a UE capability to support a per-band maximum power for a radio band com-bination (BC) used by the UE, determining whether the UE supports per-band maximum power for the radio BC based on the indication of the UE capability, and in response to determining the UE supports per-band maximum power for the radio BC, determining a total UE transmission power based on a sum of a maximum power of each band in the radio BC.

Implementations can include one or more of the following features.

For example, indication of a UE capability to support a per-band maximum power can indicate uplink carrier aggre-gation (CA) is supported by the UE. The radio BC can support two or more uplink CA. The indication of a UE capability to support a per-band maximum power can indi-cate that the UE is capable of operating at full power in each uplink band. The indication of a UE capability to support a per-band maximum power can indicates that the UE is capable of operating at full power in each uplink band. The indication of a UE capability to support a per-band maxi-mum power can indicate that the UE is capable of operating at full power in each uplink band. The indication of a UE capability to support a per-band maximum power can indi-cate that the UE is capable of operating at full power in each uplink band. The method can further include receiving, from the UE, the per-band PC for each band in the radio BC.

The method can further include calculating a maximum allowed UE transmission power for each band based on a maximum power class associated with a corresponding band for the radio BC and applying, in uplink power control, the maximum UE transmission power for each band without considering the per-BC power class for the radio BC. The indication of the UE capability to support the per-band maximum power for the radio BC used by the UE can be included in a UE power capability report and if the UE power capability report does not include the indication of the UE capability to support the per-band maximum power for the radio BC used by the UE, the uplink power control is based on a default power control. If a radio band includes two or more uplink carriers, the combined power can be limited to the PC for the associated radio band.

The method can further include relaxing a lower boundary of a total configured maximum output power as a delta value equal to the sum of a maximum power of each band in the radio BC minus a maximum of one of the respective NR band or an intra band NR CA UE Power Classes within a corresponding band configuration. The method can further include relaxing a lower boundary of a total configured maximum output power by replacing the UL power class for the UL CA with the maximum of one of the respective NR band or an intra band NR CA UE Power Classes for the UL CA. The method can further include relaxing a lower boundary of a total configured maximum output power for UL inter-band CA by replacing UL power class for the UL CA instead of the sum in the formula to determine the lower boundary formula with the UL power class for the UL CA.

The details of one or more examples of embodiments are set forth in the accompanying drawings and the description below. Other features will be apparent from the description and drawings, and from the claims.

BRIEF DESCRIPTION OF THE DRAWINGS

FIG. 5 illustrates a block diagram of a method of controlling up-link (UL) power according to an example embodiment.

FIG. 6 illustrates a block diagram of a method of controlling up-link (UL) power according to an example embodiment.

DETAILED DESCRIPTION

Figure 1:
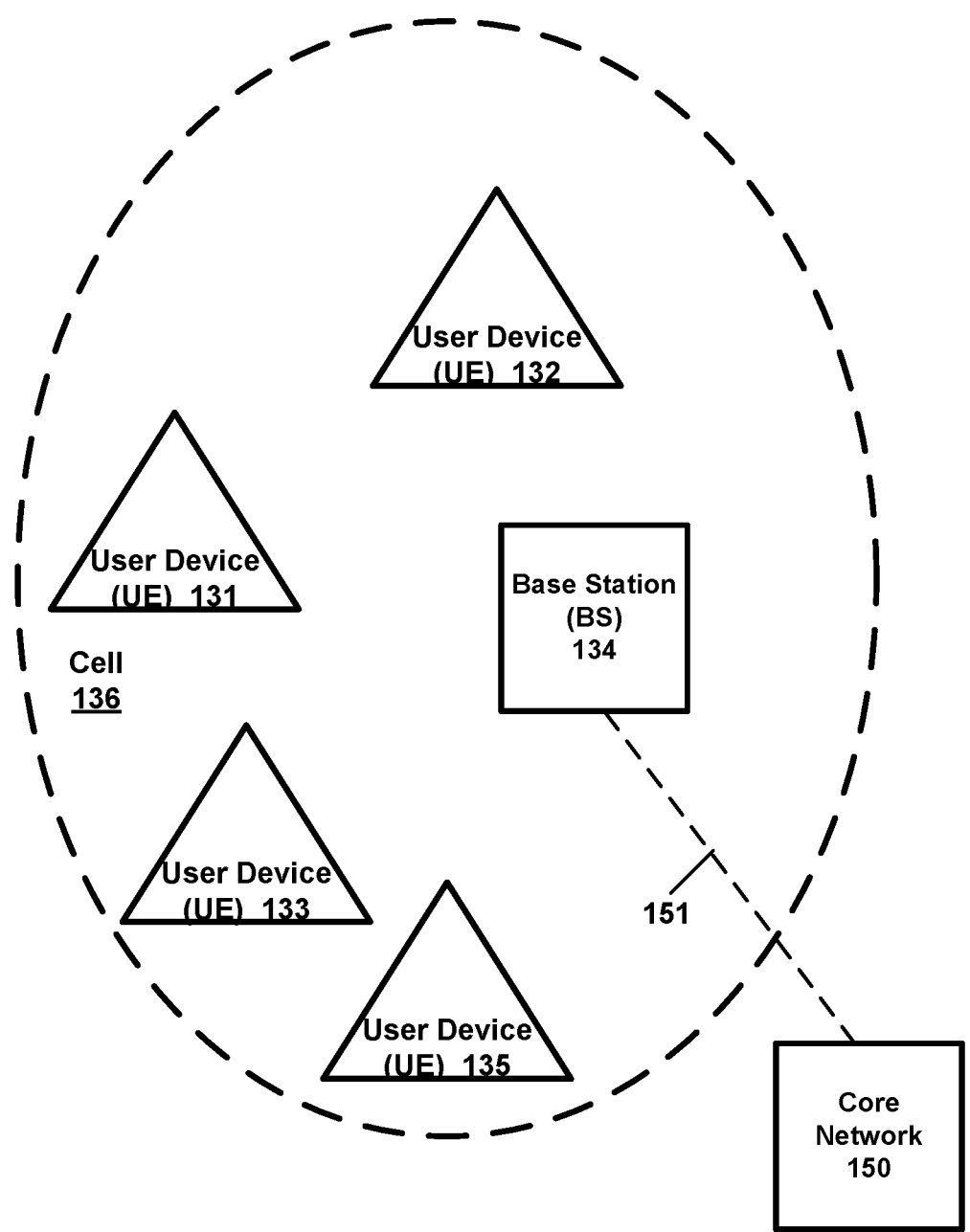
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU-CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node.

Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network (e.g., which may be referred to as 5GC in 5G/NR).

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), massive MTC (mMTC), Internet of Things (IOT), and/or narrow band IoT user devices, enhanced mobile broadband (eMBB), and ultra-reliable and low-latency communications (URLLC). Many of these new 5G (NR)—related applications may require generally higher performance than previous wireless networks.

IOT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE. Ultra-reliable and low-latency communications (URLLC) is a new data service type, or new usage scenario, which may be supported for New Radio (5G) systems.

This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, mMTC, eMBB, URLLC, etc., or any other wireless network or wireless technology. These example networks, technologies or data service types are provided only as illustrative examples.

Initially, power class 3 (23 dBm, hereafter called PC3) was included in the LTE specification. Later, power class 2 (26 dBm, hereafter called PC2) was introduced into many TDD bands for single band operation. In response to the specification for PC2 for single band becoming stable in 3GPP, applying PC2 to band combinations such as inter band CA, Dual connectivity, and the like began. Dual connectivity was also created as a generalization of carrier aggregation and most aspects of CA (such as UL power) may apply also DC (this dual connectivity is sometimes generally referred to as multi-connectivity). Demand for PC2 originally came from operators whose main bands are TDD bands. Now because allowing a UE to transmit at even higher power has a great effect on improving network coverage and network capacity, more operators have been requesting to have PC2 for their operating bands.

Current standards define power classes (PC) such that PC may restrict UE from exploiting the full UE hardware capabilities in certain cases. For example, current specifications restrict a UE's hardware capability to transmit at a maximum possible power during up-link (UL) inter band carrier aggregation (CA). Table 1 illustrates an example standard UE PC2 for UL inter band CA. Table 1 indicates that even if the sum of the powers from Carrier x and y is more than 26 dBm such as 27.8 dBm for both case b and case c and 29 dBm for case d, the total power is limited by the UE power class for UL inter band CA that is 26 dBm.

TABLE 1

| | UE power class UL inter band CA | NR Carrier x power class | NR Carrier y power class |
|---|---|---|---|
| Case a | 26 dBm | 23 dBm | 23 dBm |
| Case b | 26 dBm | 23 dBm | 26 dBm |
| Case c | 26 dBm | 26 dBm | 23 dBm |
| Case d | 26 dBm | 26 dBm | 26 dBm |

A solution to the above problem can be to enable the network device to know that it can control UL power per band of the UE based on capabilities of the UE. In other words, the UE can report capabilities associated with PC to the network device and indicate that the UE can operate at full power in each UL band. The network device can control UE power based on the reported UE capabilities associated with PC for the used band configuration. A field can be added to a UE capability report to indicate that the UE is capable of operating at full power in each UL band. If the field is not present in the UE capability report, the network can consider the UE as not being capable of (and/or not desired at this time) operating at full power in each UL band concurrently.

From a UE perspective, if the UE does not indicate to network in its UE capabilities that the UE is capable of operating at full power (which is sometimes labelled as the UE capability fullPowerUL-CA in this text) for UL CA (and MR-DC) band configuration and/or the UE does not report PC, the default (per band configuration) PC can be used. For example, the default (per band configuration) PC (e.g., in NR RRC, the UE capability BandCombination:: power-Class-v1530 or BandCombination:: ue-PowerClass-v1610) can apply. If the UE does not indicate to network in its UE capabilities that the UE is capable of operating at full power (e.g., fullPowerUL-CA) for UL CA (and MR-DC) band configuration and the UE reports PC for the UL CA band configuration, the reported PC can apply. If the UE indicates to network in its UE capabilities that the UE is capable of operating at full power (e.g., fullPowerUL-CA) for UL CA (and MR-DC) band configuration, the UE indication implies that the network device can control UE power based on the reported per band capabilities associated with PC.

From the network perspective, if the field indicating that the UE is capable of operating at full power (e.g., fullPow-erUL-CA) for UL CA (and MR-DC) band configuration is not present, the network considers that the UE's PC is the default. For example, PC3 or the PC if a PC for the UL CA can be explicitly signalled. Accordingly, the network can control each of the bands' powers of the UE by considering power allocation for each band within the total power for the UL CA. If the field indicating that the UE is capable of operating at full power (e.g., fullPowerUL-CA) for UL CA (and MR-DC) band configuration is present, the network can ignore the per-BC PC for the UL CA if signalled and utilize only the per-band PC and control each of the bands' powers of the UE independently of the per-BC power allotment.

Further, if the field indicating that the UE is capable of operating at full power (e.g., fullPowerUL-CA) for UL CA (and MR-DC) band configuration is present, the PC for the UL CA is configured as the sum of the respective PCs of each band as applicable to single band operation. Alternatively, the UE can report the additional PCs of each band within the UE capabilities of an UL CA band configuration and that is understood to override any legacy (per-band or per-BC) PC signalling that can limit the power.

Some advantages of the above solutions can be that example implementations can scale to apply it to UL CA as well as MR-DC. The network can be configured to enable maximum use of a UE's actual device capability so that coverage of UL CA/MR-DC and capacity can be increased. In addition, the network can reduce the necessity to update network software for newly defined PCs whenever a new PC is introduced. Network operators can maximize a UE's power capabilities giving UE/chipset vendors a latitude in UE design. UEs with better hardware design can operate according to UE achievable power during UL inter band CA mode within a network. The introduction of techniques for indicating individual NR bands' power classes for UL inter band CA, can enable network to know achievable maximum power per band for UL inter band CA. Accordingly, example implementations can enable the network to optimize scheduling based on the individual powers.

Figure 2:
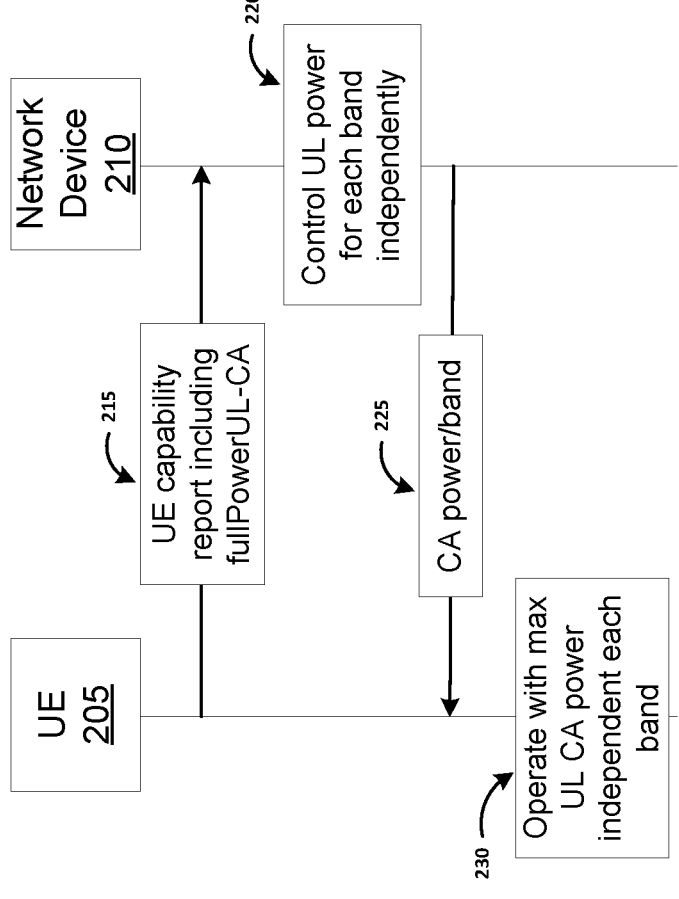
FIG. 2 is a block diagram of a signal flow according to an example embodiment.

FIG. 2 is a block diagram of a signal flow according to an example embodiment. As shown in FIG. 2, the signal flow includes communications between a UE 205 and a network device 210. The UE 205 communicates (215) (e.g., a message or signals) a UE capability report to the network device 210. For example, the UE capability report can include power class (PC) information. The PC information can include a per-band PC. For example, the PC information can include a PC (e.g., PC2, PC3, and/or the like) for each band (e.g., band A, band B, and/or the like). Further, the PC information can include a PC per band combination (BC) for UL CA. For example, the PC information can include a PC (e.g., PC2, PC3, and/or the like) per BC. If the PC information does not include a PC per BC, a default PC per BC can be PC3.

According to an example implementation, the PC information can include a field indicating that the UE 205 is capable of operating at full power in each UL band. The field can indicate that the UE 205 is capable of operating at full power (sometimes labelled as fullPowerUL-CA) for UL CA (and MR-DC) band configuration.

If the field is included, the network device 210 can control UL power for each band independently (220). In an example implementation, the network device 210 can determine the UE 205 power class as the sum of the respective NR band and/or intra band NR CA power classes that the UE 205 supports on the individual bands and/or intra band CA of this band combination. Should a band include two or more UL component carriers, the combined power is limited to the PC for the associated band. If the field is absent, the power class of this band combination (BC) can be the reported power class as specified in, for example, 3GPP TS 38.101-1 and 3GPP TS 38.101-3.

The network device 210 communicates (225) (e.g., a message or signals) signalling CA power per band to the UE 205. The CA power per band can be the PC (e.g., PC2, PC3, and/or the like) per BC communicated as PC information. As mentioned above, the UE 205 power class can be the sum of the respective NR band and/or intra band NR CA power classes that the UE 205 supports on the individual bands and/or intra band CA of this band combination. Then, the UE 205 can operate with a maximum UL CA power being independent each band (230). The maximum UL CA power can be the UE reported PC for the associated band. Should a band include two or more UL component carriers (e.g., intra-band CA), the combined power can be limited to the UE reported PC for the associated band.

Figure 3:
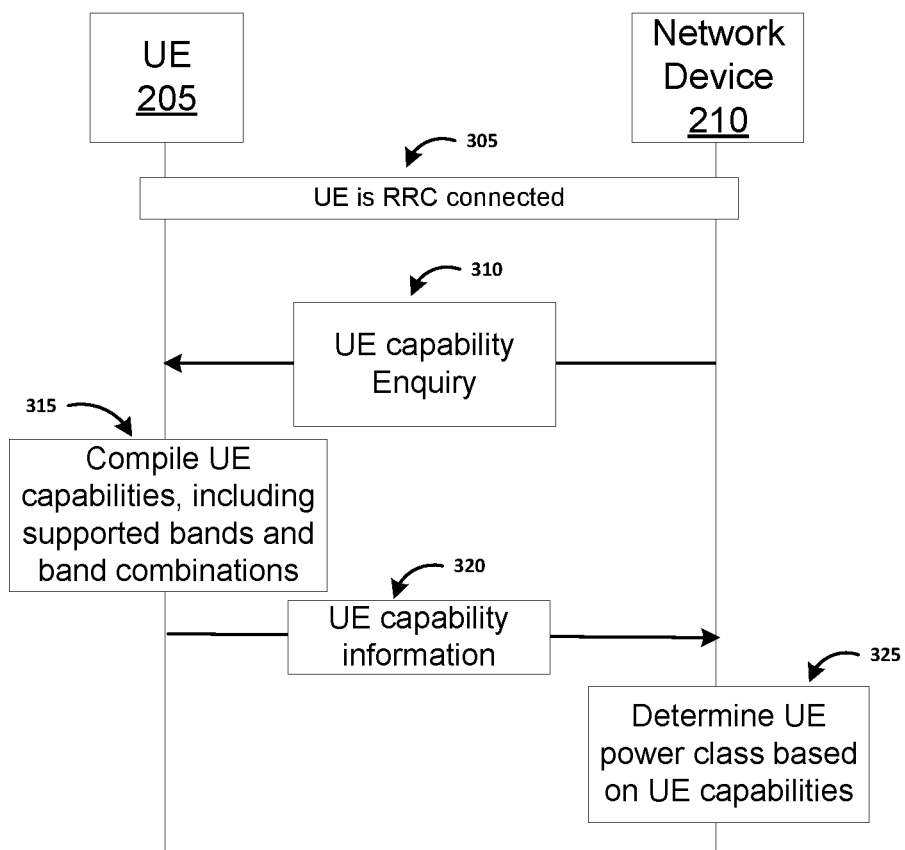
FIG. 3 new is another block diagram of a signal flow according to an example embodiment.

FIG. 3 new is another block diagram of a signal flow according to an example embodiment. As shown in FIG. 3, the signal flow includes communications between the UE 205 and the network device 210. The signal flow can correspond to signalling a UE capability report. The network device 210 communicates (310) (e.g., a message or signals) a UE capability enquiry. The UE capability enquiry can be a request for UE capability information. The UE capability enquiry can be communicated when the UE 205 is radio resource control (RRC) connected (305). The UE capability enquiry can be an RRC message communicated during an initial RRC registration process and/or any time during RRC connected state. The UE capability enquiry can include the maximum number of component carriers for which the network device 210 requests the supported CA band configurations and non-CA bands supported by the UE.

The UE 205 can compile (or generate) UE capabilities, including, at least, supported bands and band combinations (BC). The UE capabilities can include RF capabilities including, at least, power capabilities. The power capabilities can be band capabilities or band combination capabilities. The power capabilities can include power class (PC)

information for frequency bands or power class (PC) information for carrier aggregation (CA) or dual connectivity (DC) band combination.

The UE 205 communicates (320) (e.g., a message or signals) the UE capability information to the network device 210 in response to the UE capability enquiry. The network device then determines (325) the UE power class (PC) based on the UE capabilities. As discussed in more detail above, in an example implementation, the network device 210 can determine the UE 205 power class as the sum of the respective NR band and/or intra band NR CA power classes that the UE 205 supports on the individual bands and/or intra band CA of this band configuration. Should a band include two or more UL component carriers, the combined power is limited to the PC for the associated band. If the field is absent, the power class of this band configuration (BC) can be the reported power class as specified in, for example, 3GPP TS 38.101-1 and 3GPP TS 38.101-3.

Figure 4:
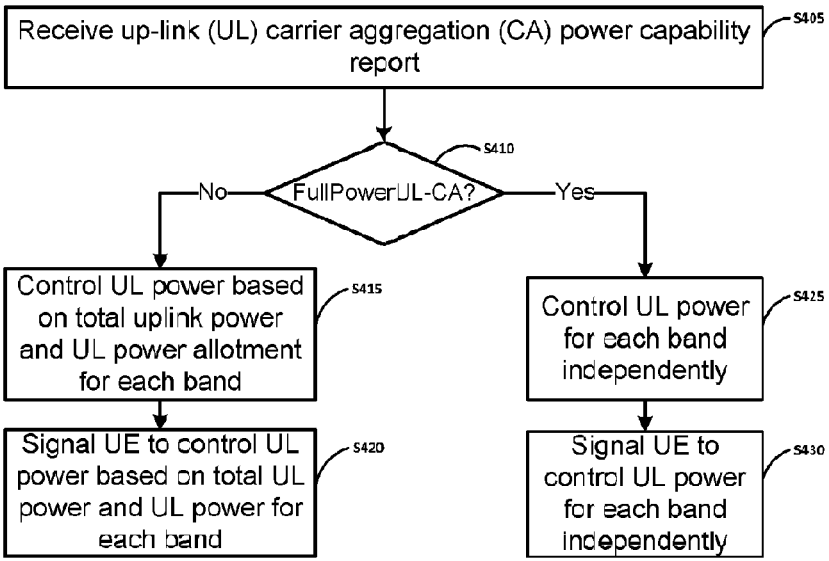
FIG. 4 is a flow diagram illustrating a method of controlling up-link (UL) power according to an example embodiment.

FIG. 4 is a flow diagram illustrating a method of controlling up-link (UL) power according to an example embodiment. As shown in FIG. 4, in step S405 an up-link (UL) carrier aggregation (CA) power capability report is received. For example, a UE can communicate (e.g., a message or signal) a UE capability report to a network device. The UE capability report can include power class (PC) information. The PC information can include a per-band PC. The PC information can include a PC (e.g., PC2, PC3, and/or the like) for each band (e.g., band A, band B, and/or the like). Further, the PC information can include a PC per band combination (BC) for UL CA. The PC information can include a PC (e.g., PC2, PC3, and/or the like) per BC. If the PC information does not include a PC per BC, a default PC per BC can be PC3. According to an example implementation, the PC information can include a field indicating that the UE is capable of operating at full power in each UL band. The field can indicate that the UE is capable of operating at full power (sometimes labelled as fullPowerUL-CA) for a UL CA (and MR-DC) band configuration.

In step S410 whether or not the report includes a field indicating that the UE is capable of operating at full power in each UL band (e.g., fullPowerUL-CA) is determined. If the report does not include a field indicating that the UE is capable of operating at full power in each UL band, processing continues to step S415. Otherwise, if the report includes a field indicating that the UE is capable of operating at full power in each UL band, processing continues to step S425.

In step S415 UL power is controlled based on both total uplink power and UL power allotment for each band within the PC for the UL CA. For example, the UL power can be the maximum UE power associated with a PC (e.g., PC2 or PC3) with UL power allotment per band where only one of the UL powers per band can be the maximum. Note that both UL powers per band can be the maximum only when the PC for UL CA is equal to the sum of PCs per band within the CA. The UL power can be the linear value of the PC. As discussed above, the PC can be based on a standard. Then, in step S420 the UE is signalled to control UL power based on total UL power and UL power for each band. For example, the UE power control is communicated (e.g., in a message or signal) to the UE.

In step S425 UL power is controlled for each band independently. For example, the UL power class for the UL CA can be determined as the sum of the respective NR band and/or intra band NR CA power classes that the UE supports on the individual bands and/or intra band CA of this band combination. In addition, the UL power class for the UL CA can be determined using (or based on) the maximum output power specified in 3GPP TS 38.101-1 or 3GPP TS 38.101-3 which can allow for a relaxation of the lower boundary of the total configured maximum output power as a delta value equal associated with the aforementioned sum minus the maximum among the respective NR band and/or intra band NR CA UE Power Classes within this band configuration. In other words, relaxing a lower boundary of a total configured maximum output power by replacing the UL power class for the UL CA with the maximum of one of the respective NR band or an intra band NR CA UE Power Classes for the UL CA.

The UE can operate with a maximum UL CA power being independent each band. The maximum UL CA power can be the UE reported PC for the associated band. Should a band include two or more UL component carriers (e.g., intra-band CA), the combined power can be limited to the UE reported PC for the associated band. Then, in step S430 the UE is signalled to control UL power for each band independently. For example, maximum UL CA power for each band is communicated (e.g., in a message or signal) to the UE without considering the power allotment.

In an example implementation, the aforementioned sum is replaced with the UL power class for the UL CA in the formula to determine the higher boundary of the total configured maximum output power while the maximum among the respective NR band and/or intra band NR CA UE Power Classes within for the UL CA is replaced with the UL power class for the UL CA in the formula to determine the lower boundary of the total configured maximum output power. In other words, relaxing a lower boundary of a total configured maximum output power for UL inter-band CA by replacing UL power class for the UL CA instead of the sum in the formula to determine the lower boundary formula with the UL power class for the UL CA.

In another example implementation, the aforementioned sum is replaced with the UL power class for the UL CA in the formula to determine the higher boundary of the total configured maximum output power while the UL power class for the UL CA stays in the formula to determine the lower boundary of the total configured maximum output power. In other words, relaxing a lower boundary of a total configured maximum output power for UL inter-band CA by replacing UL power class for the UL CA instead of the sum in the formula to determine the lower boundary formula with the UL power class for the UL CA.

Example implementations can be mathematically illustrated. For example, for uplink inter-band carrier aggregation with one serving cell c per operating band when same slot symbol pattern is used in all aggregated serving cells, can be $P_{CMAX\_L} = \text{MIN} \{10 \log_{10} \Sigma \text{ MIN } [p_{EMAX,c}/(\Delta t_{C,c}),$
$p_{PowerClass,c}/(\text{MAX}(\text{mpr}_c, \text{a-mpr}_c) \cdot \Delta t_{C,c} \cdot \Delta t_{IB,c}$
$\Delta t_{RxSRS,c}), \quad p_{PowerClass,c}/\text{pmpr}_c], \quad P_{EMAX,CA},$
$P_{PowerClass,CA} - \Delta T_{Full}\},$ $P_{CMAX\_H} = \text{MIN} \{10 \log_{1-0} \Sigma \quad p_{EMAX,c}, \quad P_{EMAX,CA},$
$P_{PowerClass,CA}\},$ where $p_{EMAX,c}$ is the linear value of $P_{EMAX,c}$ which is given by IE P-Max for serving cell c;

$p_{PowerClass,c}$ is the linear value of the maximum UE power for serving cell c specified in Table 6.2.1-1 of 3GPP TS38.101-1 without taking into account the tolerance;

If the field of fullPowerUL-CA is not present, $P_{PowerClass,CA}$ is the maximum UE power specified in Table 6.2A.1.3-1 of 3GPP TS38.101-1 without taking into account the tolerance specified in the Table 6.2A.1.3-1 of 3GPP TS38.101-1;

$p_{PowerClass,CA}$ is the linear value of $P_{PowerClass,CA}$;

If the field of fullPowerUL-CA is present, $p_{PowerClass,CA} = \Sigma p_{PowerClass,c}$;

$\Delta t_{Full}$ is the linear value of $\Delta T_{Full}$ defined as $\Delta t_{Full} = \Sigma p_{PowerClass,c} - MAX(p_{PowerClass,c})$. $\Delta T_{Full}$ applies if the field of fullPowerUL-CA is present.

Example 1. FIG. 5 is a block diagram of a method of controlling up-link (UL) power according to an example embodiment. Operation S505 includes indicating, from a user equipment (UE) to a network device, support for a maximum power based on a per-band power class (PC) for a radio band combination (BC) including two or more uplink carriers. Operation S510 includes applying, in uplink power control, maximum UE transmission according to the per-band PC for each band in the radio BC.

Example 2. The method of Example 1, wherein uplink carrier aggregation (CA) is supported by the UE.

Example 3. The method of Example 2, wherein the radio BC supports two or more uplink CA.

Example 4. The method of Example 1 to Example 3, further comprising indicating, from the UE to the network device, the per-band PC for each band in the radio BC.

Example 5. The method of Example 1 to Example 4, wherein the indicating of the support for the maximum power based on a per-band indicates that the UE is capable of operating at full power in each uplink band.

Example 6. The method of Example 1 to Example 5, wherein if a radio band includes two or more uplink carriers, the combined power is limited to the PC for the associated radio band.

Example 7. FIG. 6 is a block diagram of a method of controlling up-link (UL) power according to an example embodiment. Operation 705 includes receiving, at a network device from a user equipment (UE), an indication of a UE capability to support a per-band maximum power for a radio band combination (BC) used by the UE. Operation 710 includes determining whether the UE supports per-band maximum power for the radio BC based on the indication of the UE capability. Operation 715 includes in response to determining the UE supports per-band maximum power for the radio BC, determining a total UE transmission power based on a sum of a maximum power of each band in the radio BC.

Example 8. The method of Example 7, wherein indication of a UE capability to support a per-band maximum power indicates uplink carrier aggregation (CA) is supported by the UE.

Example 9. The method of Example 7 and Example 8, wherein the radio BC supports two or more uplink CA.

Example 10. The method of Example 7 to Example 9, wherein indication of a UE capability to support a per-band maximum power indicates that the UE is capable of operating at full power in each uplink band.

Example 11. The method of Example 7 to Example 10, wherein indication of a UE capability to support a per-band maximum power indicates that the UE is capable of operating at full power in each uplink band.

Example 12. The method of Example 7 to Example 11, wherein indication of a UE capability to support a per-band maximum power indicates that the UE is capable of operating at full power in each uplink band.

Example 13. The method of Example 7 to Example 12, wherein indication of a UE capability to support a per-band maximum power indicates that the UE is capable of operating at full power in each uplink band.

Example 14. The method of Example 7 to Example 13, further comprising receiving, from the UE, the per-band PC for each band in the radio BC.

Example 15. The method of Example 7 to Example 14, further comprising calculating a maximum allowed UE transmission power for each band based on a maximum power class associated with a corresponding band for the radio BC and applying, in uplink power control, the maximum UE transmission power for each band without considering the per-BC power class for the radio BC.

Example 16. The method of Example 7 to Example 15, wherein the indication of the UE capability to support the per-band maximum power for the radio BC used by the UE is included in a UE power capability report and if the UE power capability report does not include the indication of the UE capability to support the per-band maximum power for the radio BC used by the UE, the uplink power control is based on a default power control.

Example 17. The method of Example 7 to Example 16, wherein if a radio band includes two or more uplink carriers, the combined power is limited to the PC for the associated radio band.

Example 18. The method of Example 7 to Example 17, further comprising relaxing a lower boundary of a total configured maximum output power as a delta value equal to the sum of a maximum power of each band in the radio BC minus a maximum of one of the respective NR band or an intra band NR CA UE Power Classes within a corresponding band configuration.

Example 19. The method of Example 7 to Example 18, further comprising relaxing a lower boundary of a total configured maximum output power by replacing the UL power class for the UL CA with the maximum of one of the respective NR band or an intra band NR CA UE Power Classes for the UL CA.

Example 20. The method of Example 7 to Example 19, further comprising relaxing a lower boundary of a total configured maximum output power for UL inter-band CA by replacing UL power class for the UL CA instead of the sum in the formula to determine the lower boundary formula with the UL power class for the UL CA.

Example 21. A non-transitory computer-readable storage medium comprising instructions stored thereon that, when executed by at least one processor, are configured to cause a computing system to perform the method of any of Examples 1-20.

Example 22. An apparatus comprising means for performing the method of any of Examples 1-20.

Example 23. An apparatus comprising: at least one processor: and at least one memory including computer program code: the at least one memory and the computer program code configured to, with the at least one processor, cause the apparatus at least to perform the method of any of Examples 1-20.

Figure 7:
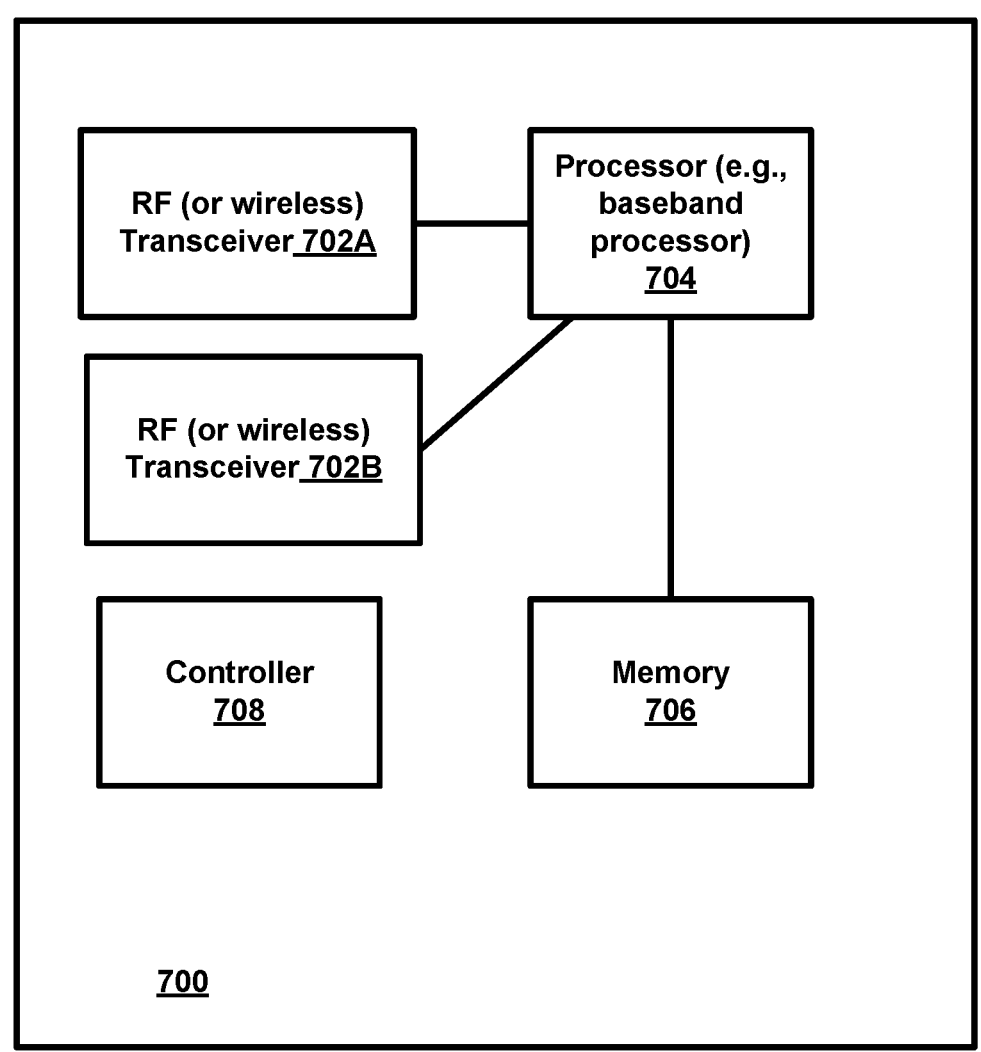
FIG. 7 is a block diagram of a wireless station or wireless node (e.g., AP, BS, gNB, RAN node, relay node, UE or user device, network node, network entity, DU, CU-CP, CU-CP, . . . or other node) according to an example embodiment.

FIG. 7 is a block diagram of a wireless station 700 or wireless node or network node 700 according to an example embodiment. The wireless node or wireless station or network node 700 may include, e.g., one or more of an AP, BS, gNB, RAN node, relay node, UE or user device, network node, network entity, DU, CU-CP, CU-UP, . . . or other node) according to an example embodiment.

The wireless station 700 may include, for example, one or more (e.g., two as shown in FIG. 7) radio frequency (RF) or wireless transceivers 702A, 702B, where each wireless transceiver includes a transmitter to transmit signals and a receiver to receive signals. The wireless station also includes a processor or control unit/entity (controller) 704 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

According to another example embodiment, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices: magnetic disks, e.g., internal hard disks or removable disks: magneto-optical disks: and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback: and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    providing, using a user equipment (UE), to a network device, an indication of a UE capability to support a per-band maximum power based on a per-band power class (PC) for a radio band combination (BC), the radio BC including two or more uplink carriers; and
    operating with a maximum UE transmission power (PC-MAX) over the two or more uplink carriers, wherein an upper limit for PCMAX (PCMAX_H) and a lower limit for PCMAX (PCMAX_L) are determined using a summation of the per-band PC for respective bands of radio bands in the radio BC, such that the PCMAX may exceed an indicated uplink power class transmission power of the UE for an inter band carrier aggregation of the two or more uplink carriers.

2. The method of claim 1, wherein uplink carrier aggregation (CA) is supported by the UE.

3. The method of claim 2, wherein the radio BC supports two or more uplink CA.

4. The method according to claim 1, further comprising:
    providing, using the UE, to the network device, the per-band PC for respective bands of the radio bands in the radio BC.

5. The method of claim 1, wherein the indication of the UE capability to support the per-band maximum power based on the per-band PC for the radio BC indicates that the UE is capable of operating at full power in respective uplink bands.

6. The method of claim 1, wherein, if a radio band includes two or more uplink carriers, a combined power is limited to the PC for an associated radio band.

7. The method of claim 1, further comprising:
    relaxing a lower boundary of a total configured maximum output power as a delta value equal to a sum of a maximum power of respective bands of the radio bands in the radio BC minus a maximum of one of a respective NR band or an intra band NR CA UE Power Classes within a corresponding band configuration.

8. The method of claim 7, further comprising:
    relaxing a lower boundary of a total configured maximum output power by replacing a UL power class for an UL CA with the maximum of one of a respective NR band or an intra band NR CA UE Power Classes for the UL CA.

9. The method of claim 1, further comprising:
    relaxing a lower boundary of a total configured maximum output power for UL inter-band CA by replacing a UL power class for the UL CA instead of a sum in a formula to determine the lower boundary formula with the UL power class for the UL CA.

10. A method comprising:
    receiving, at a network device, from a user equipment (UE), an indication of a UE capability to support a per-band maximum power based on a per-band power class (PC) for a radio band combination (BC) used by the UE, the radio BC including two or more uplink carriers;
    determining, based on the indication of the UE capability, whether the UE supports the per-band maximum power for the radio BC; and
    in response to determining the UE supports the per-band maximum power for the radio BC, determining a total UE transmission power (PCMAX) over the two or more uplink carriers, wherein an upper limit for PCMAX (PCMAX_H) and a lower limit for PCMAX (PCMAX_L) are determined using a summation of the per-band PC for respective bands of radio bands in the radio BC, such that the PCMAX may exceed an indicated uplink power class transmission power of the UE for an inter band carrier aggregation of the two or more uplink carriers..

11. The method of claim 10, wherein the indication of the UE capability to support the per-band maximum power for the radio BC used by the UE indicates uplink carrier aggregation (CA) is supported by the UE.

12. The method of claim 11, wherein the radio BC supports two or more uplink CA.

13. The method of claim 10, wherein the indication of the UE capability to support the per-band maximum power for the radio BC used by the UE indicates that the UE is capable of operating at full power in respective uplink bands.

14. The method according to claim 10, further comprising:

receiving, at the network device, from the UE, a per-band power class (PC) for respective bands of the radio bands in the radio BC.

15. The method of claim 10, further comprising:

calculating a maximum allowed UE transmission power for respective bands of the radio bands in the radio BC based on the maximum PC associated with a corresponding band for the radio BC; and applying, in uplink power control, the maximum UE transmission power for respective bands in the radio BC without considering a per-band power class for the radio BC.

16. The method of claim 10, wherein the indication of the UE capability to support the per-band maximum power for the radio BC used by the UE is included in a UE power capability report, and if the UE power capability report does not include the indication of the UE capability to support the per-band maximum power for the radio BC used by the UE, uplink power control is based on a default power control.

17. The method of claim 10, wherein, if a radio band includes two or more uplink carriers, a combined power is limited to a power class for an associated radio band.

18. The method of claim 10, further comprising:

relaxing a lower boundary of a total configured maximum output power as a delta value equal to the sum of the maximum power of respective bands in the radio BC minus a maximum of one of a respective NR band or an intra band NR CA UE Power Classes within a corresponding band configuration.

19. The method of claim 18, further comprising:

relaxing a lower boundary of a total configured maximum output power by replacing a UL power class for an UL CA with the maximum of one of a respective NR band or an intra band NR CA UE Power Classes for the UL CA.

20. The method of claim 10, further comprising:

relaxing a lower boundary of a total configured maximum output power for UL inter-band CA by replacing a UL power class for the UL CA instead of the sum in a formula to determine the lower boundary formula with the UL power class for the UL CA.

21. A user equipment (UE) comprising:

at least one processor; and at least one memory storing instructions thereon that, when executed by the at least one processor, cause the user equipment to perform at least:

providing, to a network device, an indication of a UE capability to support a per-band maximum power based on a per-band power class (PC) for a radio band combination (BC), the radio BC including two or more uplink carriers; and applying, in uplink power control for uplink transmissions from the UE, a maximum UE transmission power (PCMAX) according to the per-band PC for respective bands of bands in the radio BC, wherein an upper limit for PCMAX (PCMAX_H) and a lower limit for PCMAX (PCMAX_L) are determined using a summation of a per-band power class for respective bands of radio bands in the radio BC, such that the PCMAX may exceed an indicated uplink power class transmission power of the UE for an inter band carrier aggregation of the two or more uplink carriers.

22. An apparatus comprising:

at least one processor; and at least one memory storing instructions thereon that, when executed by the at least one processor, cause the apparatus to perform at least:

receiving, from a user equipment (UE), an indication of a UE capability to support a per-band maximum power based on a per-band power class (PC) for a radio band combination (BC) used by the UE, the radio BC including two or more uplink carriers;

determining, based on a sum of a maximum power of respective bands in the radio BC, whether the UE supports the per-band maximum power for the radio BC used by the UE; and in response to determining the UE supports the per-band maximum power for the radio BC, determining a total UE transmission power (PCMAX) over the two or more uplink carriers, wherein an upper limit for PCMAX (PCMAX_H) and a lower limit for PCMAX (PCMAX_L) are determined using a summation of the per-band PC for respective bands of radio bands in the radio BC, such that the PCMAX may exceed an indicated uplink power class transmission power of the UE for an inter band carrier aggregation of the two or more uplink carriers.

* * * * *